Oct. 5, 1937.  F. P. TAUGHER  2,094,973
SCREW-DOWN CONTROL SYSTEM
Filed Feb. 14, 1934  8 Sheets-Sheet 1

WITNESSES:

INVENTOR
Frank P. Taugher.
BY
ATTORNEY

Oct. 5, 1937.  F. P. TAUGHER  2,094,973
SCREW-DOWN CONTROL SYSTEM
Filed Feb. 14, 1934    8 Sheets-Sheet 2

WITNESSES:

INVENTOR
Frank P. Taugher.
BY
ATTORNEY

Oct. 5, 1937.　　　F. P. TAUGHER　　　2,094,973
SCREW-DOWN CONTROL SYSTEM
Filed Feb. 14, 1934　　　8 Sheets-Sheet 3

WITNESSES:
C. J. Weller.
R. R. Lockwood

INVENTOR
Frank P. Taugher.
BY
G. M. Crawford
ATTORNEY

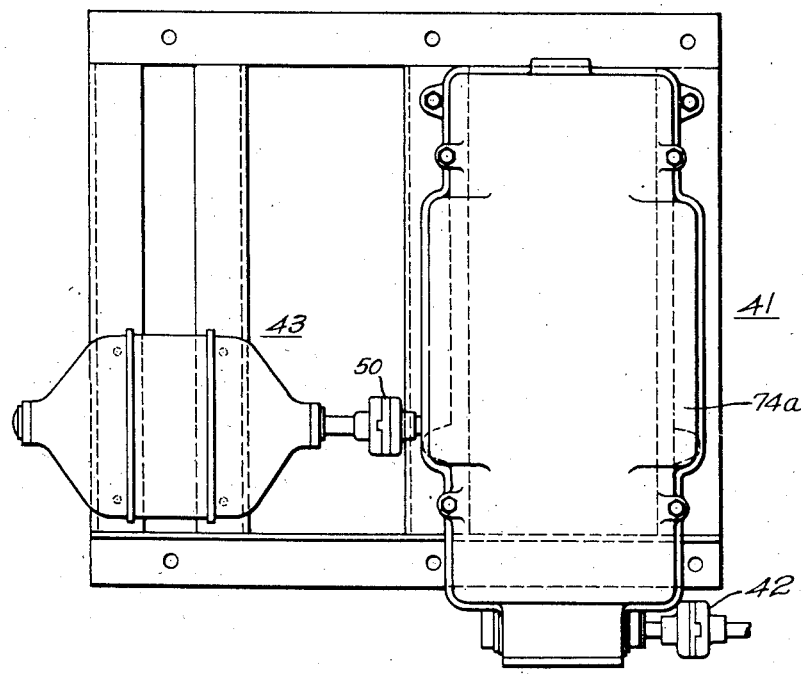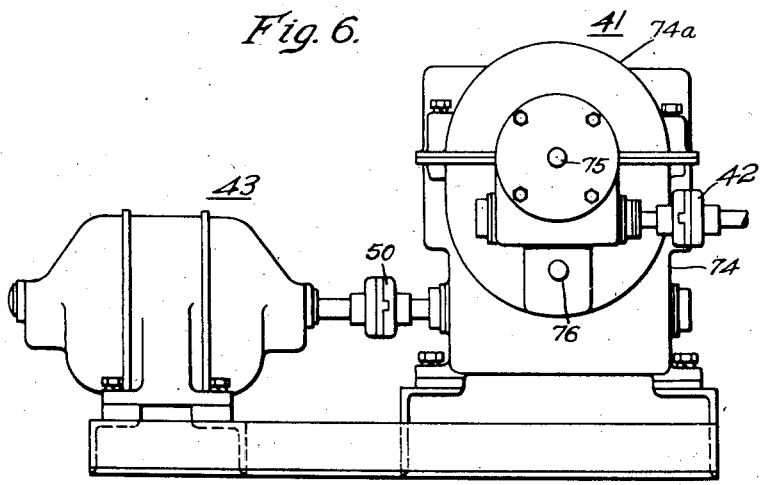

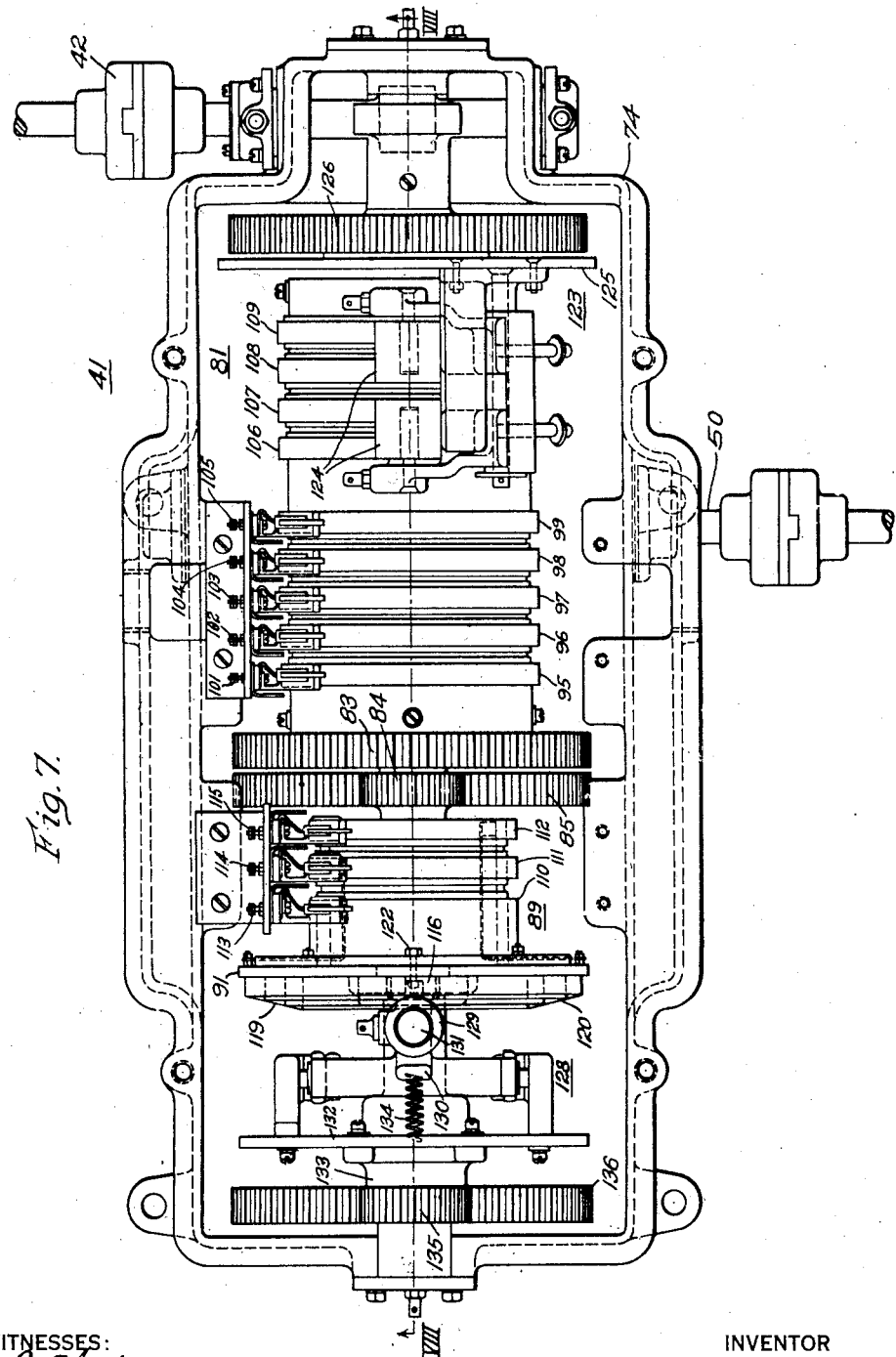

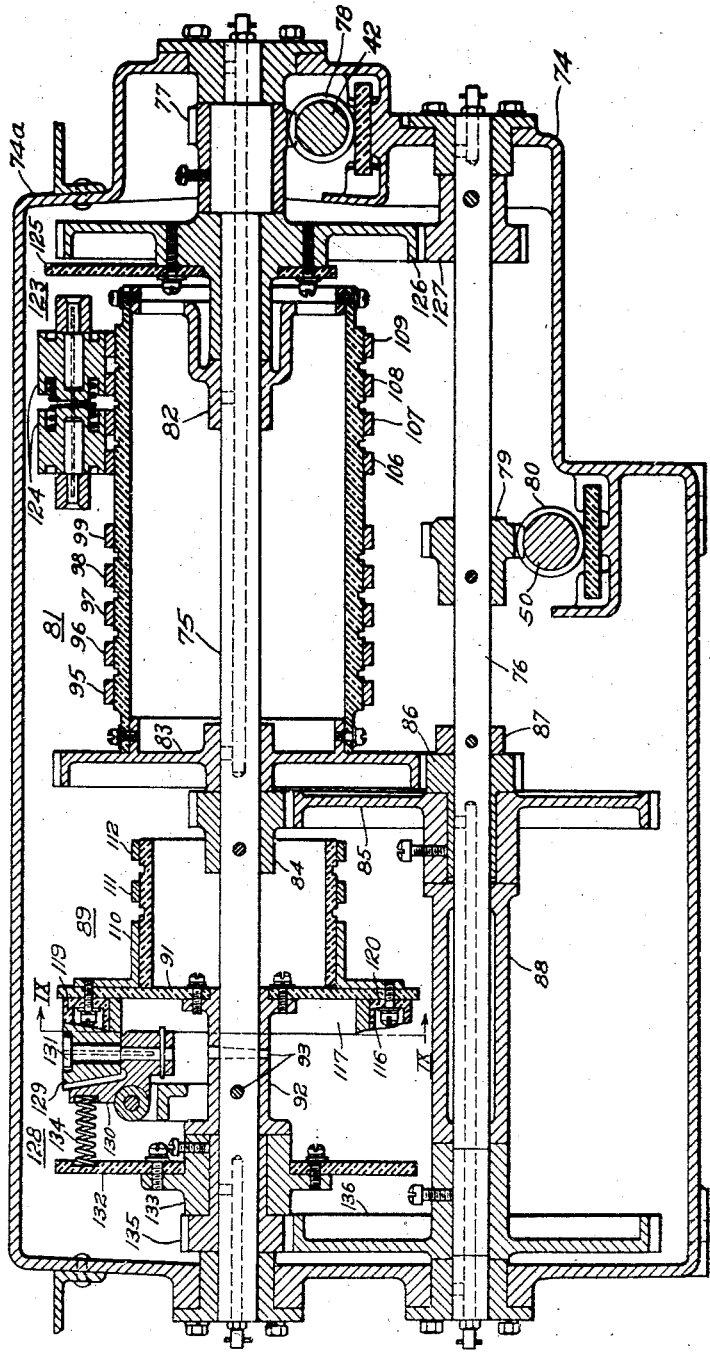

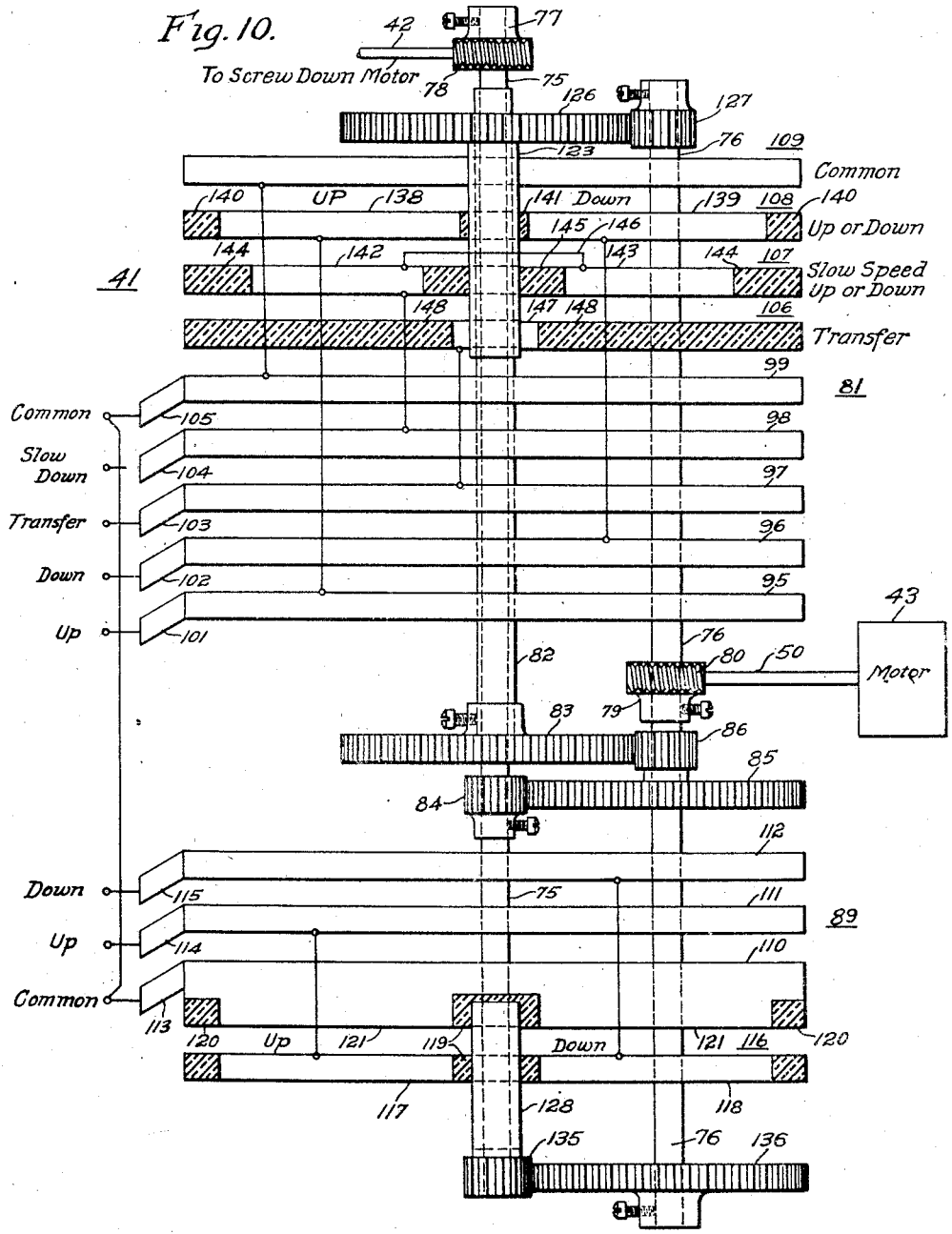

Oct. 5, 1937.   F. P. TAUGHER   2,094,973
SCREW-DOWN CONTROL SYSTEM
Filed Feb. 14, 1934   8 Sheets-Sheet 8
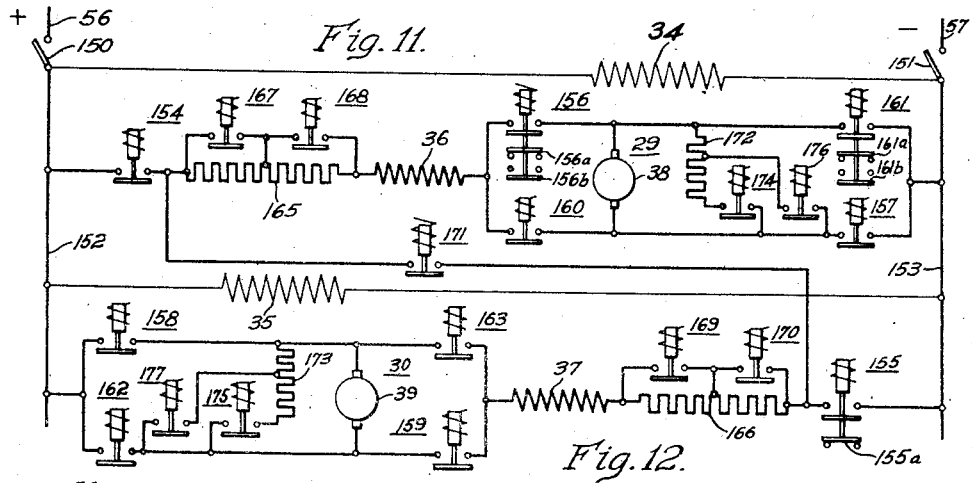
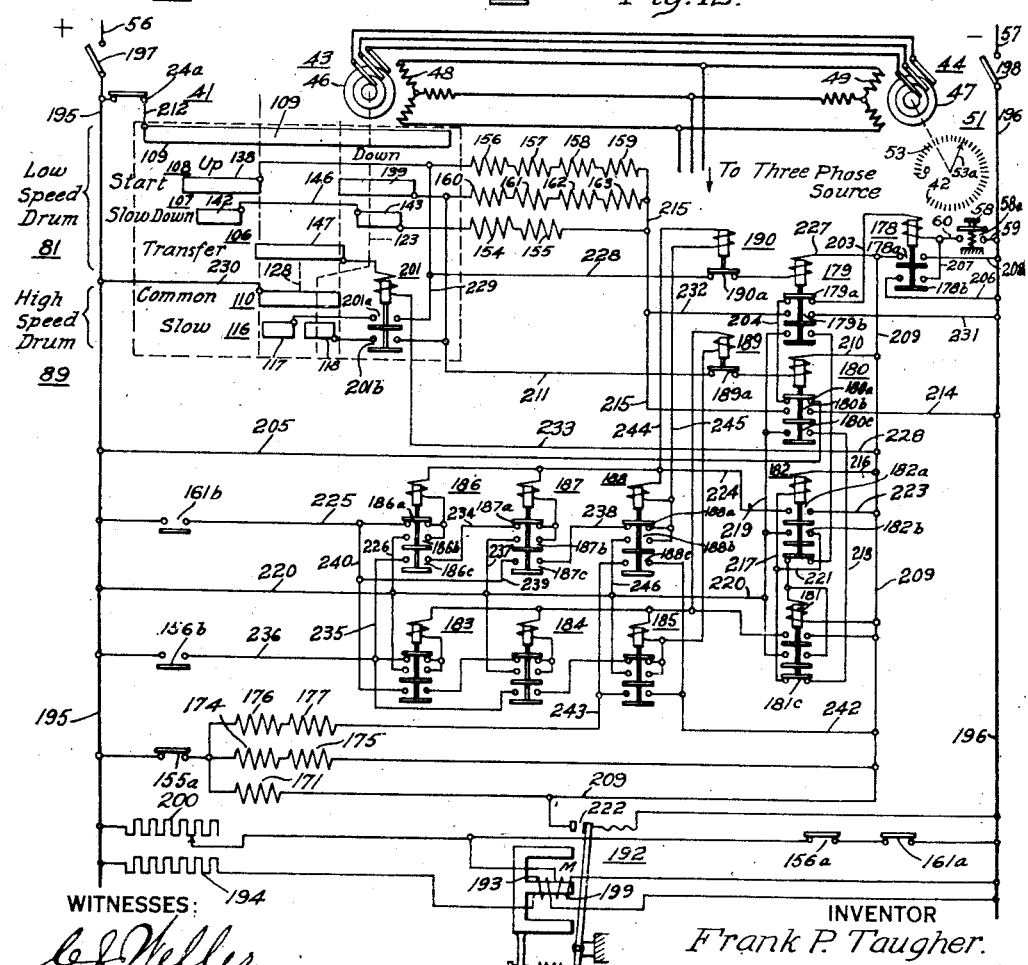
WITNESSES:
C. J. Weller.
R. R. Lockwood
INVENTOR
Frank P. Taugher.
BY G. M. Crawford
ATTORNEY Patented Oct. 5, 1937

2,094,973

UNITED STATES PATENT OFFICE 2,094,973

SCREW-DOWN CONTROL SYSTEM

Frank P. Taugher, Forest Hills, Pa., assignor to Westinghouse Electric & Manufacturing Company, East Pittsburgh, Pa., a corporation of Pennsylvania Application February 14, 1934, Serial No. 711,179

9 Claims. (Cl. 172—239)

My invention relates generally to control systems and apparatus and it has particular relation to such systems as are employed in the operation of steel mills.

The object of my invention, generally stated, is the provision of a screw-down control system and apparatus for steel mills which shall be simple, accurate and efficient in operation and readily and economically manufactured and installed.

The principal object of my invention is to provide for manually presetting the opening between the rolls of a steel rolling mill and for thereafter automatically adjusting the rolls to the preset position.

Another object of my invention is to reduce to a minimum the size of the limit switch required to control the screw-down motors of a rolling mill.

Other objects of my invention will, in part, be obvious and, in part appear hereinafter.

My invention, accordingly, is disclosed in the embodiment hereof shown in the accompanying drawings, and comprises the features of construction, combination of elements and arrangement of parts which will be exemplified in the construction hereinafter set forth, and the scope of the application of which will be indicated in the appended claims.

For a more complete understanding of the nature and scope of my invention, reference may be had to the following detailed description taken in connection with the accompanying drawings, in which:

Fig. 5 is a plan view of the driven motor and limit switch constituting parts of this invention.

Fig. 6 is a view, in side elevation, of the apparatus illustrated in Fig. 5.

Fig. 7 is an enlarged plan view of the limit switch shown in Figs. 5 and 6, the cover being removed.

Fig. 8 is a sectional view taken along the line VIII—VIII of Fig. 7.

Fig. 10 is a diagrammatic view of the drum development of the limit switch.

Fig. 11 is a diagrammatic view of the main power circuits for the screw-down motors, and Fig. 12 is a diagrammatic view of the system employed for controlling the screw-down motors in accordance with the present invention.

Figure 1:
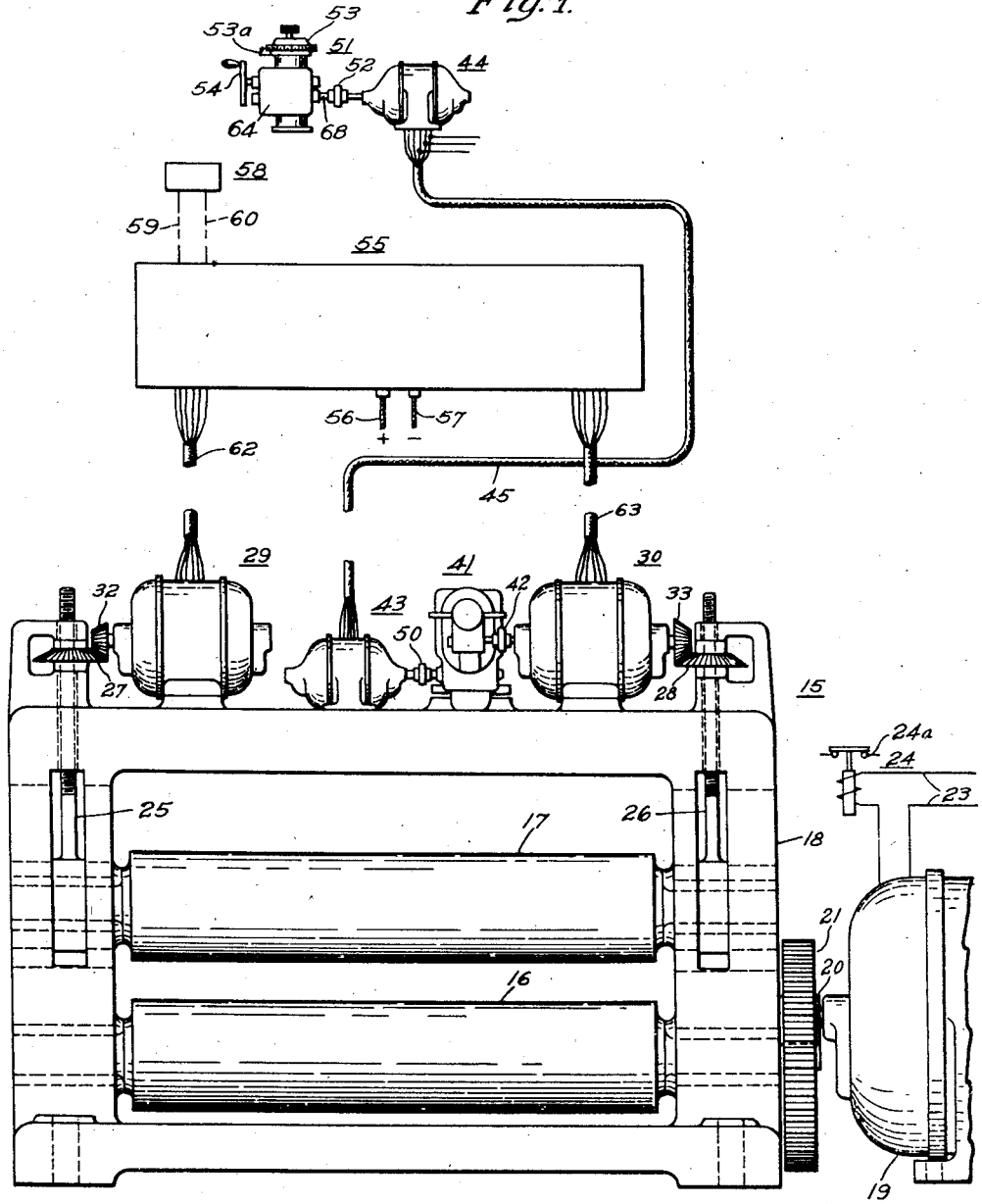
Figure 1 is a general schematic view of a steel rolling mill showing in a general way how the system and apparatus embodying the principal features of the invention may be applied in practice.

In order to briefly set forth the novel features and functioning of the invention, a short general description thereof will be given which will be followed by a detailed description of the structural features and the operation of a preferred embodiment of the invention.

In order to adjust the rolls of a blooming mill to any desired opening therebetween, screw-down motors are provided for operating the screw-down mechanism. It is desirable to adjust the opening between the rolls with a considerable degree of accuracy and, therefore, it is essential that the motors driving the screw-down mechanisms be disconnected from the source of energy when the desired position is reached, and it is further essential that the entire mechanism stop at this point. It is also desirable to preset the next position of the rolls while a rolling operation is being performed and to set up circuits which will automatically initiate the movement of the movable roll to the preset position and to stop it at the preset position within the established limits of accuracy.

While a brake mechanism can be used for stopping further movement of the screw-down mechanism at the preset position, it has been found that apparatus embodying this type of mechanism does not lend itself readily to the speed and accuracy required. In order to stop the screw-down mechanism at the preset position according to this invention, the power to the screw-down motors is interrupted and the inherent friction of the moving parts is utilized for arresting further movement.

In the event that the movable roll is not stopped at the preset position but overshoots because of the inertia of the moving parts, the screw-down motors are plugged and the movable roll is then moved in a reverse direction. If the roll again overshoots, the plugging operation is again repeated in the original direction.

The plugging operation may be carried out any number of times but it has been found that the movable roll is usually stopped at the preset position within the desired limits of accuracy after the screw-down motors have been plugged for two successive times. In order to increase the effectiveness of the plugging operation, various steps of shunting resistors are connected in parallel with the armatures of the screw-down motors during successive plugging operations.

In order to disconnect the screw-down motors from the source of energy at the preset position, a limit switch is provided having positions corresponding to the range of movement of the movable roll in either an "up" or a "down" direction. A single element limit switch, which would accomplish this function with the desired accuracy, would be unreasonably large for the desired range of movement of the movable roll in most instances and, therefore, a comparatively small two element limit switch has been provided.

The limit switch comprises two drums which are geared together and are driven by one of the screw-down motors. One of the drums is a low-speed drum and is provided with a control ring which corresponds to the entire range of movement of the movable roll in either direction. The other drum is geared to rotate at a higher rate than the low-speed drum and is also provided with a control ring which corresponds to any narrow range of movement of the movable roll.

In addition, the low-speed drum is provided with a slow-down ring which serves to effect the connection of the screw-down motors from parallel-circuit relation, which is used in starting, to series-circuit relation as the preset position is approached, thereby effecting a decrease in the speed of movement of the movable roll.

The low-speed drum is also provided with a transfer ring which is effective to transfer the control of the screw-down motors from the control ring on the low-speed drum to the control ring on the high speed drum as the preset position is approached.

The limit switch is preset by means of contact arms which are individual to each of the drums and are rotatable relative thereto for the purpose of bridging the various control rings to common energized rings. The contact arms are geared together so that the relative speeds thereof are the same as the relative speeds of the drums.

The contact arms are rotated from a remote point by means of a synchronous drive unit, of well known construction, to the position corresponding to the desired setting of the movable roll, thereby setting up circuits which are completed at a predetermined time in the cycle of operation of the motor driving the rolls and on the operation of the master control switch to energize the screw-down motors. The corresponding rotation of the screw-down motor driving the drums causes their rotation to a position at which the contact arms no longer serve to complete the control circuits and the screw-down motors are disconnected from the source of energy.

Referring specifically to Fig. 1 of the drawings, a rolling mill shown generally at 15 is provided having a stationary roll 16 and a movable roll 17, both of which are mounted in a suitable frame 18.

In order to drive the roll 16 a motor 19 is provided having a driving connection with the roll 16 through suitable gears 20 and 21. The motor 19 is supplied with power through conductors 23. As indicated, a current relay 24 is connected in the circuit supplying power to the motor 19 and is provided with break contact members 24a, the purpose of which will be hereinafter set forth.

As illustrated, the upper or movable roll 17 is adjustable in the frame 18. Its movement may be controlled by means of suitably threaded screws 25 and 26 on which are provided suitable internally-threaded bevel gears 27 and 28. The bevel gears 27 and 28 are mounted in suitable brackets on the frame 18, as shown, and, when rotated, move the roller 17 in either an upward or downward direction depending upon the direction of rotation.

In order to rotate the bevel gears 27 and 28, screw-down motors 29 and 30 are provided which have driving connections with the bevel gears 27 and 28 through additional bevel gears 32 and 33.

Referring particularly to Fig. 11 of the drawings, the screw-down motors 29 and 30 are provided, respectively, with shunt field windings 34 and 35, series field windings 36 and 37 and armatures 38 and 39.

In order to control the operation of the screw-down motors 29 and 30, a limit switch, shown generally at 41, is provided which has driving connection with the screw-down motor 30 through a suitable coupling and shaft assembly 42.

The limit switch 41 is preset to any desired position by means of a synchronous drive unit which comprises a driven motor 43 and a driving motor 44 which are connected together by means of a suitable multi-conductor cable 45.

Referring particularly to Fig. 12 of the drawings, the motors 43 and 44 are of the polyphase, wound-rotor type. Each is provided, respectively, with a wound rotor shown diagrammatically at 46 and 47 and field windings 48 and 49 which are connected together, as illustrated, and to a suitable source of polyphase current.

The driven motor 43 has driving connection with the limit switch 41 through the agency of a suitable coupling and shaft assembly 50.

The rotor 47 of the driving motor 44 may be adjusted to any desired position by means of the dial mechanism shown generally at 51, Figs. 1 and 12, which has driving connection with the rotor 47 through the agency of a shaft and coupling assembly 52. The dial mechanism 51 is provided with a graduated dial 53, an indicator or pointer 53a and a hand-wheel 54 for manually controlling its operation.

The screw-down motors 29 and 30 are energized from suitable control equipment which may be housed in a controller, shown generally at 55, and to which power is supplied from a suitable direct current source by conductors 56 and 57. The diagram of the electrical connections for the controller 55 is shown in detail in Figs. 11 and 12 and will be described in detail hereinafter.

In order to initiate the functioning of the control apparatus, a master controller, shown generally at 58, is provided and connected to the controller 55 by means of conductors 59 and 60.

As illustrated in Fig. 12 of the drawings, the master control switch 58 is of the push button type. However, it will be understood that it may be of any suitable type such as a drum switch or its equivalent, since it is only required to complete a single control circuit.

It will be understood that the master control switch 58 together with the dial mechanism 51 and the driving motor 44 are located at a convenient position relative to the operator of the rolling mill. It will also be understood that the controller 55 may be positioned in any suitable location and connected to the screw-down motors 29 and 30 by means of suitable multi-conductor cables 62 and 63.

Figure 2:
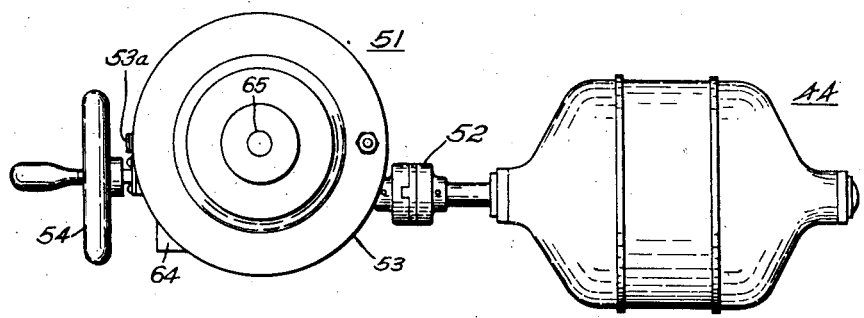
Fig. 2 is a plan view of the dial mechanism and driving motor used in practicing the invention.
Figure 3:
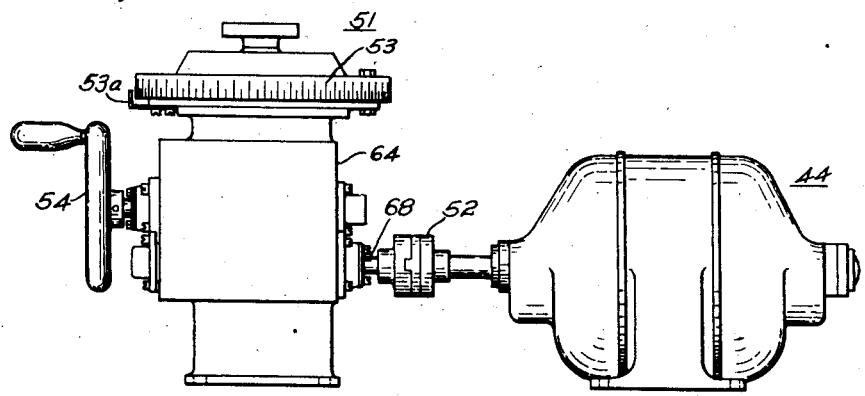
Fig. 3 is a view, in side elevation, of the apparatus illustrated in Fig. 2.
Figure 4:
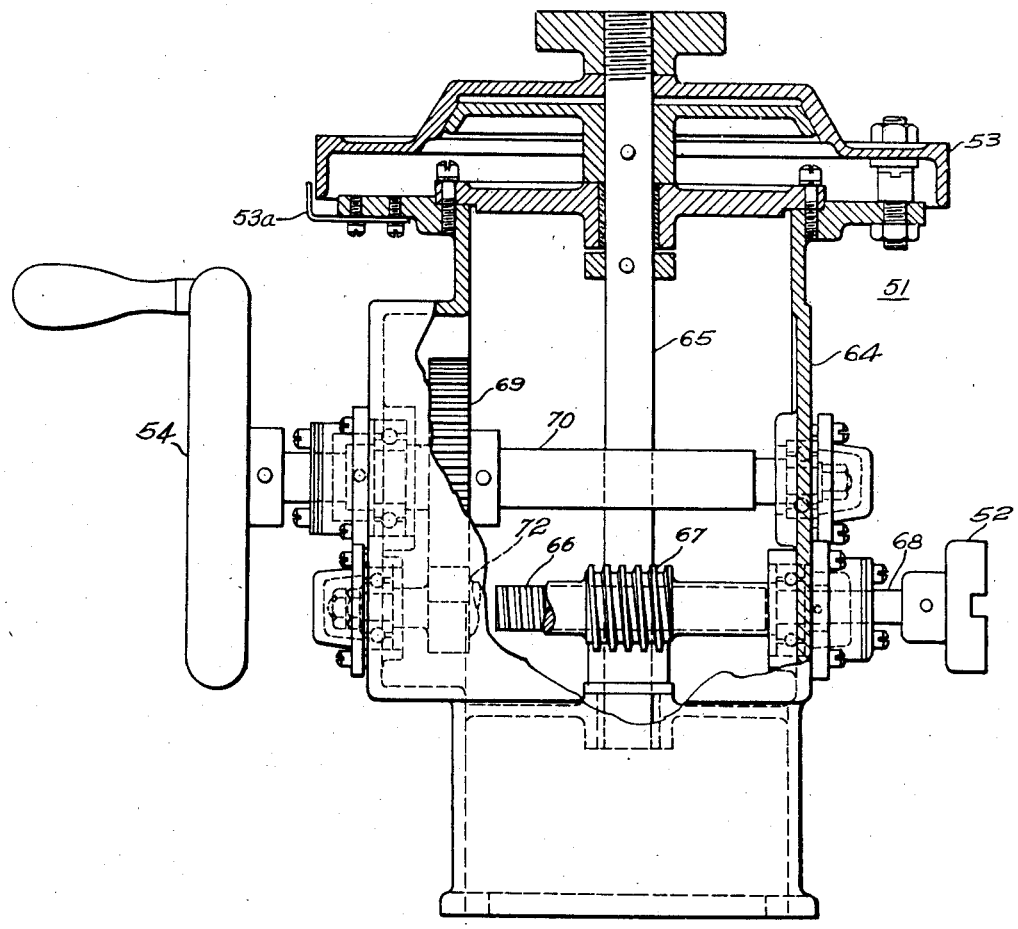
Fig. 4 is an enlarged view, partly in section and partly in side elevation, of the dial mechanism shown in Figs. 2 and 3, certain parts being broken away to more clearly illustrate the construction.

Referring now to Figs. 2, 3, and 4 of the drawings, the dial mechanism 51 comprises a frame 64 on which the dial 53 is rotatably mounted by means of a shaft 65 journalled in suitable bearings near the ends thereof. The shaft 65 is provided with a gear wheel 66 which meshes with and is driven by a worm 67 mounted on a shaft 68. The shaft 68 may be rotated by the hand-wheel 54 through the agency of a gear wheel 69, secured to a shaft 70 on which the hand-wheel 54 is mounted, and a pinion 72, which is secured to the shaft 68.

The rotation of the hand-wheel 54 serves to rotate the dial 53 and at the same time the rotor 47 of the driving motor 44. In this instance, the dial 53 is provided with suitable graduations from 0 to 42 which correspond to a 42 inch movement of the movable roll 17 of the rolling mill 15. The graduations on the dial 53 are suitably subdivided to indicate a movement of the movable roll 17 of one-eighth of an inch. However, it will be readily understood that any other suitable calibration of the dial 53 may be provided to meet any other conditions.

Referring now particularly to Figs. 5, 6, 7, 8, and 9 of the drawings which show the detailed construction of the limit switch 41, it will be observed that the limit switch 41 comprises a suitable housing 74 over which a suitable cover 74a may be placed.

Within the housing 74, a drum drive shaft 75 and a contact-arm drive shaft 76 are rotatably mounted in suitable bearings, as illustrated. The drum drive shaft 75 is provided with a gear 77 which is driven by means of a worm 78 from the screw-down motor 30 through the shaft and coupling assembly 42 while the contact-arm drive shaft 76 is provided with a gear 79 which is driven by means of the driven motor 43 through the agency of the shaft and coupling assembly 50 and a worm 80 which is mounted thereon.

A low-speed drum, shown generally at 81, is rotatably mounted on the shaft 75 by means of a sleeve 82 at the right hand end and is secured, at the left-hand end, to a gear wheel 83, which is also rotatably mounted on the shaft 75. The gear wheel 83 is driven through the agency of a pinion 84 which is secured to the shaft 75, gear wheel 85 and pinion 86, which are rotatably mounted on the shaft 76 and which, respectively, engage the pinion 84 and the gear wheel 83, as shown. In order to maintain the gear wheel 85 and the pinion 86 in the desired position on the shaft 76, a collar 87, secured to the shaft 76, and a spacer sleeve 88 are provided.

In addition to the low-speed drum 81, a high-speed drum, shown generally at 89, is also provided which is directly mounted on the shaft 75 and, therefore, it rotates at the same speed of rotation as the shaft 75. The high-speed drum 89 is secured to an insulating ring 91 which, in turn, is secured to a sleeve 92 that is fastened to the shaft 75 by means of pins 93.

The low-speed drum 81 is provided with contact rings 95 to 99, inclusive, with which brush members 101 to 105, inclusive, make contact, respectively, to provide connections to control rings on the low-speed drum 81.

The low-speed drum 81 is also provided with a transfer ring 106, a slow-down ring 107, a control ring 108 and a common ring 109. The construction and arrangement of the rings 106 to 109, inclusive, will be set forth in detail hereinafter.

The high-speed drum 89 is provided with contact rings 110, 111 and 112 with which brush members 113, 114, and 115, engage respectively.

Figure 9:
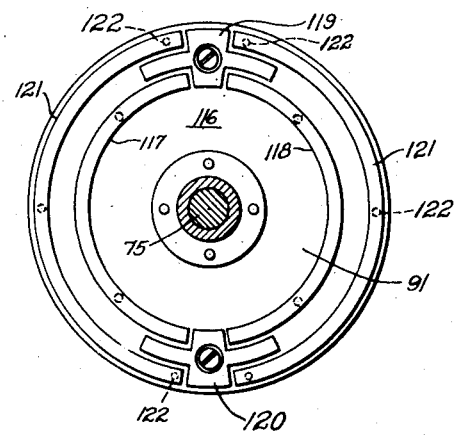
Fig. 9 is a view taken along the line IX—IX of Fig. 8.

As is more clearly shown in Fig. 9, of the drawings, the insulating plate 91 has mounted thereon a control ring shown generally at 116 which comprises contact segments 117 and 118 that are spaced apart by means of insulating segments 119 and 120. The insulating member 91 also has mounted thereon contact segments 121 which are connected directly to the ring 110 by means of screws 122, as illustrated.

In order to bridge the control rings 106 to 109, inclusive, for effecting the control operations, which will be described hereinafter in detail, a low-speed contact arm shown generally at 123 in Figs. 7 and 8 is provided. The contact arm 123 comprises suitable rollers 124 which form a single connection and serve to bridge the rings 106 to 109, as illustrated. The contact arm 123 is mounted on a suitable insulating member 125 which, in turn, is mounted on a gear wheel 126. The gear wheel 126 is rotatably mounted on the shaft 75 and is driven by means of a pinion 127 which is secured to the shaft 76 and rotates therewith.

With a view to bridging the control ring 116 and the contact segments 121 carried by the insulating member 91 on the high speed drum 89, a high-speed contact arm, shown generally at 128, is provided. The contact arm 128 comprises a roller 129 which is rotatably mounted on a suitable frame 130 by means of a pin 131. The frame 130 is pivotally mounted on an insulating member 132 which is mounted on a sleeve 133. The roller 129 is maintained in engagement with the control ring 116 and the contact segments 121 by means of a suitable compression spring 134 mounted between the frame 130 and the insulating member 132, as shown.

The sleeve 133 is secured to a pinion 135 which, as illustrated, is rotatably mounted on the shaft 75. The pinion 135 is driven by means of a gear wheel 136 which is secured to the shaft 76.

In view of the foregoing it will be apparent that the limit switch 41 is provided with a low-speed drum 81 and a high-speed drum 89 which are driven by means of the screw-down motor 30 to rotate at different rates. The ratio of these rates is fixed by the gearing through which the drums are connected together and to the shaft 75. More will be said about this ratio as the description proceeds. It will also be observed that a low-speed contact arm 123 and a high speed contact arm 128 are provided which are rotated by means of the driven motor 43 from the shaft 76 and that these arms have a definite ratio of rates of rotation which is identical with the ratio of the rates of rotation of the drums 81 and 89.

For a more complete understanding of the construction and operation of the limit switch 41, reference should be made to Fig. 10 of the drawings. In this figure a drum development of the low-speed drum 81 and the high-speed drum 89 is shown. It will be observed that the sleeve 82, shown in Fig. 8, is illustrated as a hollow shaft rotatable about the shaft 75 and carrying the rings 95 to 99, inclusive, and 106 to 109, inclusive, which are rotated by means of the gear wheel 83 from the shaft 75, as set forth hereinbefore. It will also be observed that the rings 110, 111, 112, and 116 are illustrated as being directly mounted on the shaft 75 and rotatable therewith.

The low-speed contact arm 123 is illustrated as being connected directly to the gear wheel 126 which is driven by means of the shaft 76, as described hereinbefore. The high speed contact arm 128 is illustrated as being directly connected to the pinion 135 which is also driven from the shaft 76.

It will be understood that the low-speed drum 81 and the high-speed drum 89 are rotatable on the rotation of the shaft 75 which, in turn, is rotated in accordance with the rotation of the screw-down motor 30.

The low-speed contact arm 123 and the high-speed contact arm 128 are rotatable in accordance with the rotation of the shaft 76 which is driven by means of the driven motor 43 which, in turn, is controlled by means of the driving motor 44 as adjusted by the dial mechanism 51.

It will be understood in the drum development that the left-hand ends of the control and contact rings and the right-hand ends of these rings are identical, the rings being split and shown in a flattened position in the conventional manner. Therefore, whatever insulating members are illustrated as being on the left-hand ends of the rings are continued on the right-hand ends thereof and will be given the same reference character as in the previous figures of the drawings.

Referring specifically to the low-speed drum 81, the rings 95 to 99, inclusive, and 109 are continuous contact segments which extend around the entire periphery of the drum 81. The rings 95 to 99, inclusive, serve merely to connect the various control circuits to the contact segments of the rings 106 to 109, inclusive, as will be hereinafter set forth, through the brush members 101 to 105, inclusive, while the ring 109 serves as a common ring which is bridged to the control rings 106, 107, and 108 by means of the contact arm 123.

The control ring 108 comprises contact segments 138 and 139 which are spaced apart by means of insulating segments 140 and 141. The length of the contact segments 138 and 139 corresponds to the entire range of movement of the movable roll 17 or to the number of revolutions of the screw-down motor 30 which it is necessary to take in either direction to accomplish the movement of the roll 17 between the extreme positions.

The contact arm 123 serves to maintain the motors 29 and 30 energized as long as it is in engagement with the common ring 109 and either of the contact segments 138 or 139 of the control ring 108. If no further control apparatus were provided, the screw-down motors 29 and 30 would be de-energized when the contact arm 123 was caused to engage the insulating segment 141.

As set forth hereinbefore, in order to stop the roll 17 within the required limits of accuracy it would be necessary to increase the size of the control ring 108 beyond practical limits in order to provide the proper relative length of insulating segments with respect to the contact segments. Therefore, the high-speed drum 89 is provided to magnify the effect of the ratio between the length of the insulating segment 141 relative to the length of either of the contact segments 138 or 139 at any position where it is desired to stop the movable roll 17.

In addition to the control ring 108, the slow-speed ring 107 is provided which comprises contact segments 142 and 143 which are spaced apart by means of insulating segments 144 and 145. The contact segments 142 and 143 are connected together by means of a conductor 146.

It will be observed that the contact segments 142 and 143 are shorter than the corresponding segments 138 and 139 of the control ring 108. This relative difference in their lengths is provided in order to permit the slow-down operation to be effected at some time prior to the movement of the contact arm 123 to the insulating segment 141 of the control ring 108.

The low-speed drum 81 is also provided with the transfer ring 106 comprising a contact segment 147 and an insulating segment 148. It will be observed that the contact segment 147 is slightly longer than the insulating segment 141 of the control ring 108. This relatively greater length is provided in order to initiate the functioning of the transfer system prior to the time when the contact arm 123 engages the insulating segment 141.

The various contact segments of the rings 106, 107 and 108 and the common ring 109 are connected to the rings 95 to 99, inclusive, by means of suitable conductors, as illustrated.

As set forth hereinbefore, the high-speed drum 89 is provided with contact segments 117 and 118 which are spaced apart by means of the insulating segments 119 and 120. The contact segments 117 and 118 correspond, respectively, to the contact segments 138 and 139 of the control ring 108 on the low-speed drum 81 and are of a length depending upon the ratio between the rates of rotation of the drums to provide the required accuracy in stopping the roll 17 at the desired position. The contact arm 128 serves to connect either of the contact segments 117 or 118 to the segments 121 of the common ring 110.

As illustrated, suitable conductors are provided for connecting the segments 117 and 118 of the corresponding rings 111 and 112.

While the common ring 110 on the high-speed drum 89 is illustrated as being provided with the same insulating segments 119 and 120 as are provided for the ring 116, it will be obvious that they may be omitted, but in this embodiment of the invention they are utilized for structural reasons.

As set forth hereinbefore, the length of the contact segments 138 and 139, on the control ring 108 of the low-speed drum 82, corresponds to the entire range of movement of the movable roll 17. In like manner, the length of either of the contact segments 117 and 118 corresponds to any small portion of that movement, on which portion depends the setting of the contact arms 123 and 128. Thus, at the position at which it is desired to stop the roll 17, the available travel of the contact member 123 is greatly magnified by means of the high speed drum 89 and a very accurate setting of the roll 17 is obtained.

In order to understand more fully how the screw-down motors 29 and 30 are controlled to effect the movement of the roll 17 and its stopping at the desired position, reference should now be had to the diagram shown in Figs. 11 and 12 of the drawings. In Fig. 11, the circuits utilized for connecting the screw-down motors 29 and 30 to the source of energy, which is represented by means of conductors 56 and 57, are shown. The various switches and relays used are illustrated with energizing coils and auxiliary contact members, the connections for which are shown in detail in Fig. 12.

As illustrated, the conductors 56 and 57 are connected by means of switches 150 and 151 to energize conductors 152 and 153. The screw-down motors 29 and 30 may be connected to the conductors 152 and 153 and their direction of operation determined by means of line switches 154 and 155 and reversing switches 156 to 163, inclusive, in a well known manner.

In order to accelerate the screw-down motors 29 and 30, accelerating resistors 165 and 166 are provided together with suitable accelerating switches 167, 168, 169, and 170. Since any suitable and well known control system may be used for operating the accelerating switches 167 to 170, it has been deemed unnecessary and undesirable to further complicate the specification by a detailed description of a suitable system or arrangement.

In order to decrease the speed of the screw-down motors 29 and 30 prior to the transfer of the controls from the low-speed drum 81 to the high-speed drum 89, a series connecting switch 171 is provided which functions to connect the motors in series-circuit relation on de-energization of line switches 154 and 155, as will be described more in detail hereinafter.

In order to obtain a further decrease in the speed of the screw-down motors 29 and 30, shunting resistors 172 and 173 are provided which are connected by means of shunting switches 174, 175, 176, and 177 to shunt the armatures 38 and 39 of the motors 29 and 30, respectively.

In order to avoid complication, the same numerals are applied to Fig. 12 to the windings of the switches 154 to 163, 171 and 174 to 177, inclusive, as were applied to these switches in Fig. 11. The auxiliary contact members of these switches which appear in Fig. 12 of the drawings will be designated by the same character as is applied to the switches in Fig. 11 together with a subscript to indicate the switch with which they are associated.

In Fig. 12 of the drawings, the control or limit switch 41 is illustrated diagrammatically; the various contact rings which serve to connect the control circuits to the contact segments being omitted for the sake of clearness.

In order to initiate the function of the system and to avoid the necessity for the operator to hold the master control switch 58 closed until the contact members 24a of the current relay 24 have been closed, a master control relay 178 is provided which is arranged to control the operation of an "up" master control relay 179 or "down" master control relay 180 depending upon the setting of the limit switch 41.

As set forth hereinbefore, there is a tendency for the screw-down motors 29 and 30 to overshoot the desired position and they are, therefore, plugged and reversed to operate in an opposite direction. In order to avoid the possibility of this plugging operation being continued indefinitely, two counting relay chains are provided which are controlled by an "up" counting-chain master relay 181 and a "down" counting-chain master relay 182, either of which may be energized depending upon the direction in which it is desired to move the roll 17. The "up" counting relay chain comprises relays 183, 184, and 185 while the "down" counting relay chain comprises relays 186, 187, and 188. The relays in each chain are arranged to be successively energized and to finally operate disconnecting relays 189 and 190 to prevent the further energization of relays 179 and 180 after a predetermined number of plugging operations have been effected.

In order to de-energize the entire control system a predetermined time after the last plugging operation, a time limit relay 192 is provided. This relay is of the type illustrated in Patent No. 1,753,983 to W. G. Cook and assigned to the Westinghouse Electric & Manufacturing Company.

The time limit relay 192 is provided with a neutralizing winding 193 which is connected in series circuit relation with a resistor 194 to conductors 195 and 196 which, in turn, are connected by means of knife switches 197 and 198 to the energized conductors 56 and 57. The timing of relay 192 may be adjusted by means of the adjusting screw 100 or by means of a variable resistor 200 which is connected in series circuit relation with the main winding 199, as illustrated.

As set forth hereinbefore, the contact segment 147 of the transfer ring 106 is engaged by means of the low-speed contact arm 123 thereby causing the energization of a transfer relay 201 which functions to transfer the control from the contact segments 138 and 139 of the control ring 108 on the low-speed drum 81 to the contact segments 117 and 118 of the control ring 116 on the high-speed drum 89.

In order to describe in detail the functioning of the invention, it will be assumed that the dial mechanism 51 has been set to the position indicated in Fig. 12 of the drawings and that the contact arms 123 and 128 have been set to the positions illustrated by the dotted lines shown in connection with the diagrammatic representation of the limit switch 41 in this figure of the drawings. It will then be observed that the contact segments 109, 139, and 143 are bridged by the contact arm 123 while the contact segments 110 and 118 are bridged by the high-speed contact arm 128. However, the bridging of the contact members 110 and 118 serves no function at this time for the reason that the transfer relay 201 is not energized.

After the operator has set the dial mechanism 51 to correspond to the desired opening between the rolls 16 and 17, he depresses the master control switch 58 thereby energizing the master control relay 178.

The circuit for energizing relay 178 may be traced from the energized conductor 196 through conductor 59, contact members 58a of the master switch 58, conductor 60, winding of relay 178, conductor 203, closed contact members 179a of relay 179, conductor 204, closed contact members 189a of relay 189 and conductor 205 to the energized conductor 195.

The energization of master control relay 178 completes a circuit for shunting the contact members 58a of the master control switch 58 which may be traced from the energized conductor 196 through conductor 206, contact members 178b of relay 178 and conductor 207 to the conductor 60.

The energization of master control relay 178 causes the energization of the "down" master control relay 180 which corresponds to the direction in which it is desired to move the roll 17 as preset on the limit switch 41.

The circuit for energizing relay 180 may be traced from the energized conductor 196 through conductor 208, contact members 178a of relay 178, conductors 209 and 210, winding of relay 180, closed contact members 189a of relay 189, conductor 211, contact segment 139, low-speed contact arm 123, contact ring 109, conductor 212, closed contact members 24a of current relay 24 to the energized conductor 195.

It will be understood that this circuit will not be completed until the closure of contact members 24a which is effected after the billet has passed through the rolls 16 and 17 and the current required for driving the motor 19 has been reduced to the value which permits the contacts 24a of the current relay 24 to close.

Assuming that the contact members 24a are closed, the line switches 154 and 155, together with the reversing switches 160 to 163, inclusive, will be energized thereby connecting the screw-down motors 29 and 30 in parallel circuit relation to the energized conductors 152 and 153 through their respective accelerating resistors 165 and 166. The energization of the motors 29 and 30 in this manner initiates the movement of the roll 17 in a downward direction and at the same time causes the rotation of the drums 81 and 89 of the limit switch 41. The accelerating switches 167 to 170 inclusive are energized in the customary manner to connect the motors directly to the line.

The circuit for energizing the line switches 154 and 155 and the reversing switches 160 to 163, inclusive, may be traced from the energized conductor 196 through conductor 214, contact members 180B of relay 180, conductor 215 to the windings of the aforesaid switches thence, respectively, to contact segments 143 and 139 which are bridged by the low-speed contact arm 123 to ring 109, conductor 212 and contact members 24a of current relay 24 to the energized conductor 195.

The energization of relay 180 also causes the energization of the "down" counting-chain master relay 182 and subsequently the energization of relay 186 of the "down" counting chain to set up circuits which prevent the plugging of the motors 29 and 30 more than a predetermined number of times.

The circuit for energizing relay 182 may be traced from the previously energized conductor 209 through conductor 216, winding of relay 182, conductor 217, closed contact members 181c of relay 181, conductor 218, contact members 180c of relay 180 and conductors 219 and 220 to the energized conductor 195.

It will be observed that the energization of relay 182 opens the circuit to the winding of relay 181 and prevents its energization, while relay 182 remains energized. It will also be observed that the relay 182 completes a holding circuit for itself which may be traced from the energized conductor 219, through contact members 182b of relay 182 and conductor 221 to the conductor 217.

The energization of the reversing switch 161, which is energized with the remaining switches 160, 162 and 163 to move the roll 17 in a downward direction, causes the auxiliary contact members 161b to close, thereby completing the circuit for energizing the counting chain relay 186.

At the same time the contact members 161a of switch 161 are opened thereby removing the short-circuit from the main winding 199 of the time limit relay 192 and permitting it to energize. The operation of time limit relay 192 serves to connect the conductor 209 directly to the energized conductor 196 through the contact members 222 thereby rendering ineffective the de-energization of the master control relay 178 which is de-energized on the energization of the "down" master control relay 180. At this time the energization of time limit relay 192 serves no other purpose for the reason that the contact members 155a of the line relay 155 are moved to the open position.

The circuit for energizing relay 186 may be traced from the energized conductor 209, through conductor 223, contact members 182a of relay 182, conductor 224, winding of relay 186, contact members 186a thereof, conductor 225 and closed contact members 161b of reversing switch 161 to the energized conductor 195. On closure, the relay 186 completes a holding circuit for itself which may be traced from the energized conductor 195 through conductors 220 and 226 through contact members 186b to the winding of the relay 186.

The system continues to operate as described, with the motors 29 and 30 connected in parallel circuit relation and driving the roll 17 downwardly at full speed and at the same time rotating the drums 81 and 89 of the master control switch 41 to the right.

As soon as the low-speed drum 81 is rotated to such a position that the contact arm 123 no longer bridges the contact segment 143 and the ring 109, the line switches 154 and 155 are de-energized and the series connecting switch 171 is energized. The motors 29 and 30 are then connected in series circuit relation and their speed is correspondingly reduced.

At the same time that the switch 171 is energized in response to the closure of the contact members 155a of the line switch 155, the shunting switches 174 and 175 are energized over an obvious circuit and thereby cause the connection of the shunting resistors 172 and 173 in parallel circuit relation with the armatures 38 and 39, respectively, and, as a result, cause the screw-down motors 29 and 30 to further decrease their speed.

The continued rotation of the low-speed drum 81 brings the segment 147 of the transfer ring 106 into engagement with the contact arm 123, thereby causing the energization of the transfer relay 201 and the subsequent transfer of the controls from the segments 138 and 139 of the control ring 108 on the low-speed drum 81 to the segments 117 and 118 of the control ring 116 on the high-speed drum 89.

The circuit for energizing relay 201 may be traced from the energized conductor 209 through conductor 233, winding of relay 201, contact segment 147, contact arm 123, ring 109, conductor 212 and contact members 24a of current relay 24 to the energized conductor 195.

The energization of the transfer relay 201 connects the segments 138 and 139 to the segments 117 and 118, respectively, and thereby permits the control of the energization of switches 156 to 163, inclusive, in accordance with the movement of the high-speed drum 89.

The continued movement of the high-speed drum finally causes the high-speed contact arm 128 to disengage from the contact segment 118, thereby permitting the de-energization of the reversing switches 160 to 163 and also the de-energization of the "down" master control relay 180.

At this time the contact members 161b are opened and the contact members 161a are closed. However, due to the holding circuit for relay 186 which has been previously traced, this relay remains energized and as a result of the timing characteristics of the time limit relay 192, its contact members 222 do not open until after the time for which it has been set.

As set forth hereinbefore, the roll 17 tends to overshoot the position for which it has been preset and, therefore, the contact segment 117 of the control ring 116 and the ring 110 on the high-speed drum 89 are bridged by the high-speed contact arm 128 to effect the energization of reversing switches 156 to 159, inclusive, to plug the motors 29 and 30 and cause the movement of the roll 17 in an upward direction. The energization of the reversing switches 156 to 159, inclusive, is effected by the energization of the "up" master control relay 179.

The circuit for energizing relay 179 may be traced from the energized conductor 209 through conductor 227, winding of relay 179, contact members 190a of relay 190, conductors 228 and 229, contact members 201a of relay 201, contact segment 117, high-speed contact arm 128, ring 110 and conductor 230 to the energized conductor 195.

The circuit for energizing the relays 156 through 159 may be traced from the energized conductor 196 through conductor 231, contact members 179b of relay 179, conductors 232 and 215 to the windings of the aforesaid relays which are connected in series circuit relation, conductor 229 and thence to the energized conductor 195 over a circuit which has previously been traced.

The energization of switch 156 opens the contact members 156a and thereby prevents the further operation of the timing cycle of the time limit relay 192 to open the contact members 222.

The closure of switch 156 also closes the contact members 156b thereby serving to energize the second relay 187 in the "down" counting chain.

The circuit for energizing relay 187 may be traced from the previously energized conductor 224 through the winding of relay 187, contact members 187a, conductor 234, contact members 186c of relay 186 which have previously been closed, conductors 235 and 236 and contact members 156b to the energized conductor 195. The energization of relay 187 completes a holding circuit for itself which may be traced from the energized conductor 195 through conductors 220 and 237 and contact members 187b of relay 187 to the winding of this relay.

The reverse rotation of the drums 81 and 89 of the limit switch 41, as the roll 17 is moved in an upward direction because of the plugging action of the motors 29 and 30, causes the high-speed contact arm 128 to disengage the contact segment 117, thereby effecting the de-energization of the reversing switches 156 to 159 inclusive and of the "up" master control relay 179. In the event that the inertia of the system is not such as to cause the contact segment 118 to again engage the high-speed contact arm 128 for a time sufficient to permit the de-energization of the time limit relay 192, no further operation will take place However, assuming that the main winding 199 of the time limit relay 192 is not de-energized for a sufficiently long period of time by being short circuited by means of the contact members 156a and 161a, the contact segment 118 is again caused to engage the high-speed contact arm 128 and the reversing switches 160 to 163, inclusive are again energized and the contact members 161a are opened.

The second energization of the reversing switches 160 to 163, inclusive, is effected on the energization of the "down" master control relay 180 a second time over a circuit which may be traced from the energized conductor 209 through conductor 210, winding of relay 180, contact members 189a of relay 189, conductor 211, contact members 201b of relay 201, contact segment 118, high-speed contact arm 128, ring 110 and conductor 230 to the energized conductor 195.

The reversing switches 160 to 163, inclusive are energized over a circuit which has previously been traced in combination with the circuit through the transfer relay 201 which also has been traced and the motors 29 and 30 are again plugged to cause them to rotate in a direction to move the roll 17 again in a downward direction.

The second energization of switch 161 causes the contact members 161b to again close, thereby completing a circuit for energizing the third relay 188 of the "down" counting chain.

The circuit for energizing relay 188 may be traced from the energized conductor 224 through winding of relay 188, contact members 189a, conductor 238, contact members 187c of relay 187, conductors 239, 240, and 225 and contact members 161b to the energized conductor 195.

The energization of the last relay 188 in the counting chain causes the energization of shunting switches 176 and 177 which function to increase the effectiveness of the shunting resistors 172 and 173 and thereby decrease the tendency for the roll 17 to again overshoot the preset position. The energization of relay 188 also causes the energization of relay 190 which opens the circuit to the energizing winding of relay 179 and prevents a subsequent plugging operation in the upward direction.

The circuit for energizing the shunting switches 176 and 177 may be traced from the energized conductor 209 through conductor 242, contact members 188c of relay 188, conductor 243, windings of switches 177 and 176 which are connected in series circuit relation and contact members 155a to the energized conductor 195.

The circuit for energizing relay 190 may be traced from the energized conductors 224 through conductor 244, winding of relay 190, conductor 245, contact members 188b of relay 188 and conductors 246 and 220 to the energized conductor 195.

It will then be observed that, in the event the roll 17 again overshoots and the contact segment 117 is again caused to engage the high speed contact arm 128, no subsequent energization of the relays 156 through 159 will take place. After the time has elapsed for which the time limit relay 192 has been set, contact members 222 will be opened, the conductor 209 will be de-energized, and thereupon the entire control system will be de-energized.

It will be readily understood, however, that any overshooting which occurs after the second plugging operation is of little or no consequence as the degree of overshooting at this time, if any exists at all, is very small and usually the roll will be set in the preset position or very nearly so.

In the event that it is desired to move the roll 17 initially in an upward direction rather than in a downward direction, as described hereinbefore, the operator merely adjusts the dial mechanism 51 to the desired position and the low-speed contact arm 123 and the high-speed contact arm 123 are moved in accordance therewith to bridge the contact segments 109 with the contact segments 138 and 142 instead of with the contact segments 139 and 143.

As far as the operator is concerned, his further operation merely consists in depressing the master control switch 58 and thereby causing the energization of the master control relay 178. In this instant the "up" master control relay 179 is energized and the corresponding "up" counting chain master relay 181 is energized over circuits which are similar to those traced hereinbefore for the previous "down" operation. The corresponding relays 183, 184, and 185 in the "up" counting relay chain are energized successively to finally energize relay 189 and prevent any further plugging operation on the part of the automatic control system.

It will be readily apparent that the functioning of the limit switch 41 may be reversed insofar as connecting the screw-down motor 30 in driving connection with the contact arms 123 and 128 rather than with the drums 81 and 89, as shown in this modification of the invention. If the limit switch 41 were so connected, the drums 81 and 89 would then be connected to the driven motor 43 and the sequence of operation would be fundamentally the same as described hereinbefore.

While the invention has been described in connection with controlling the mechanism for adjusting the opening between the rolls of a steel rolling mill, it will be readily apparent to those skilled in the art that the system may be used in many other applications where it is desired to preset the position of certain pieces of apparatus.

Therefore, since further changes may be made in the above construction and different embodiments of the invention may be made without departing from the scope thereof, it is intended that all matter contained in the above description or shown in the accompanying drawings shall be interpreted as illustrative and not in a limiting sense.

I claim as my invention:

1. In a control system for actuating means for adjusting the position of a movable object, a limit switch operative in accordance with the operation of the actuating means for controlling the operation thereof, means for presetting the limit switch, means operable to permit a limited number of successive reversals of the actuating means to stop the operation of the actuating means at a predetermined position, and means for initiating the operation of the actuating means.

2. In a control system for motor means for adjusting the position of a movable object, a limit switch for controlling the operation of the motor means, the limit switch comprising a low-speed element for controlling the operation of the motor-means over a relatively wide range of positions, a high-speed element for controlling the operation of the motor means over a relatively narrow range of positions, means on the low-speed element for transferring the control of the motor means from the low-speed element to the high-speed element, means for presetting the limit switch, means operable to secure a limited number of successive reversals of the motor means to stop the operation of the motor means at a predetermined position, and manually-operable means for initiating the operation of the motor means.

3. In a control system for motor-operated means for adjusting the position of a movable object over a given range, means for connecting the motor to a source of energy, a limit switch for controlling the connection of the motor to the source of energy, the limit switch comprising control means having driving connection with the motor operated means and corresponding to the entire range of movement thereof and additional control means also having driving connection with the motor operated means and corresponding to any small range of movement thereof, means operable to permit a limited number of reversals of the motor-operated means for accurately positioning the last-named means, contact means individual to each control means for presetting the limit switch to effect the disconnection of the motor from the source of energy when the motor-operated adjusting means has been moved to a position corresponding to the position of the contact means, means for moving the contact means to any position relative to the control means, manually-operable means for controlling the last-named means from a remote point, and additional manually-operable means at the remote point for controlling the operation of the connecting means to initiate the operation of the motor-operated means.

4. In a control system for a motor operated means for adjusting the position of a movable object over a given range, means for connecting the motor to a source of energy, a limit switch for controlling the connection of the motor to the source of energy, the limit switch comprising a low-speed drum having driving connection with the motor operated means and a high-speed drum having driving connection with the low-speed drum, a control ring on the low-speed drum corresponding to the entire range of positions of the movable object, a control ring on the high-speed drum corresponding to any small range of movement of the movable object, a transfer ring on the low-speed drum, a transfer relay adapted to be controlled through the transfer ring to effect a transfer of energization of the motor from the high-speed drum to the low-speed drum, contact means individual to the rings on each of the drums and rotatable relative thereto, and means for presetting the contact means at any position along the rings corresponding to any position of the movable object to effect the disconnecting of the motor means from the source of energy at the time when the movable object is in the position corresponding to the position of the contact means by effecting the energization of the transfer relay and thereby transferring the control of the motor from the control ring on the low-speed drum to the control ring on the high-speed drum.

5. In a control system for a motor-operated means for adjusting the position of a movable object over a given range, means for connecting the motor to a source of energy, a limit switch for controlling the connection of the motor to the source of energy, a low-speed drum in the limit switch having driving connection with the motor-operated means, a control ring on the low-speed drum comprising a pair of contact segments spaced apart by an insulating segment, the length of each contact segment being proportional to the entire range of travel of the movable object and bearing a fixed ratio to the length of the insulating segment, a slow-down ring on the low-speed drum for controlling the connection to the source of energy to decrease the speed of the motor means a predetermined time before the connection to the source of energy is opened, a transfer relay, a transfer ring on the low-speed drum for controlling the operation of the transfer relay, a high-speed drum in the limit switch having driving connection with the low-speed drum, the rate of rotation of the high-speed drum relative to the rate of rotation of the low-speed drum being a function of the ratio of the lengths of the segments of the control ring on the low-speed drum, a control ring on the high-speed drum comprising a pair of contact segments spaced apart by a pair of insulating segments, the length of each contact segment being proportional to a small range of travel of the movable object, contact means individual to the rings on each of the drums and rotatable relative thereto, and means for presetting the contact means to any position along the rings thereby to effect the connection of the motor means to the source of energy to initiate the movement of the movable object to the position corresponding to the position of the contact means, to effect the change in the connection to the source of energy as controlled by the slow-down ring, to effect the energization of the transfer relay to transfer the control of the connection of the motor means to the source of energy from the control ring on the low-speed drum to the control ring on the high-speed drum, and to effect the disconnection of the motor means from the source of energy at the time when the movable object is in a position corresponding to the position of the contact means.

6. In a control system for a motor-operated means for adjusting the position of a movable object over a given range, means for connecting the motor-operated means to a source of energy, a limit switch for controlling the connection of the motor-operated means to the source of energy, a low-speed drum in the limit switch having driving connection with the motor-operated means, a control ring on the low-speed drum comprising a pair of contact segments spaced apart by a pair of insulating segments, the length of each contact segment being proportional to the entire range of travel of the movable object and bearing a fixed ratio to the length of the insulating segments, a slow-down ring on the low-speed drum for controlling the connection to the source of energy to decrease the speed of the motor-operated means a predetermined time before the connection to the source of energy is opened, a transfer relay, a transfer ring on the low-speed drum for controlling the operation of the transfer relay, a high-speed drum in the limit switch having driving connection with the low-speed drum, the rate of rotation of the high-speed drum relative to the rate of rotation of the low-speed drum being a function of the ratio of the lengths of the segments of the control ring on the low-speed drum, a control ring on the high-speed drum comprising a pair of contact segments spaced apart by a pair of insulating segments, the length of each contact segment being proportional to a small range of travel of the movable object, a low-speed contact arm independently rotatable relative to the low-speed drum for engaging the rings thereon, a high-speed contact arm rotatable relative to the high-speed drum for engaging the control ring thereon, the high-speed contact arm having driving connection with the low-speed contact arm, the ratio of the rates of rotation being the same as the ratio of the rates of rotation of the drums, and means for presetting the contact arms to any position along the rings thereby to effect the connection of the motor-operated means to the source of energy to initiate the movement of the movable object to the position corresponding to the position of the contact arms, to effect the change in the connection to the source of energy as controlled by the slow-down ring, to effect the energization of the transfer relay to transfer the control of the connection of the motor-operated means to the source of energy from the control ring on the low-speed drum to the control ring on the high-speed drum, and to effect the disconnection of the motor-operated means from the source of energy at the time when the movable object is in a position corresponding to the position of the contact arms.

7. In a control system for motor-operated means for adjusting the position of a movable object over a given range, means for connecting the motor to a source of energy, a limit switch for controlling the connection of the motor to the source of energy, control means in the limit switch having driving connection with the motor and corresponding to the entire range of movement thereof in either direction, additional control means in the limit switch having driving connection with the motor and corresponding to any small range of movement thereof in either direction, contact means individual to each control means for presetting the limit switch to effect the disconnection of the motor from the source of energy when the motor-operated means has been moved to a position corresponding to the position of the contact means, means for moving the contact means to any position relative to the control means to effect the operation of the motor in a direction corresponding thereto, means for preventing further energization of the motor after energization thereof for a predetermined number of times for a single setting of the contact means, manually-operable means for controlling the contact moving means from a remote point, and additional manually-operable means at the remote point for initiating the operation of the motor.

8. In a control system for a work device having an adjustable element driving means for the work device, motor-operated means for adjusting the position of the movable element over a given range, means for connecting the motor to a source of energy, a limit switch for controlling the connection of the motor to the source of energy, the limit switch comprising control means having driving connection with the motor-operated means and corresponding to the entire range of movement thereof in either direction, said limit switch comprising additional control means having driving connection with the motor-operated means and corresponding to any small range of movement thereof in either direction, contact means individual to each control means for presetting the limit switch to effect the disconnection of the motor from the source of energy when the motor-operated means has been moved to a position corresponding to the position of the contact means, means for moving the contact means to any position relative to the control means to effect the operation of the motor in a direction corresponding thereto, means for preventing further energization of the motor after energization thereof a predetermined number of times for a single setting of the contact means, manually-operable means for controlling the contact moving means from a remote point, additional manually-operable means at the remote point for initiating the operation of the motor-operated means, and control means associated with the driving means for the work device for preventing the operation of the motor until after a predetermined point is reached in the cycle of operation of the driving means.

9. In combination, a mechanism for adjusting the position of a movable object over a given range, a plurality of motors for actuating the adjusting mechanism, relay means for connecting the motors in parallel circuit relation and to a source of energy, additional relay means for connecting the motors in series circuit relation and to the source of energy, a limit switch for controlling the operation of the relay means, the limit switch comprising a low-speed drum having driving connection with one of the motors and a high-speed drum having driving connection with the low-speed drum, a control ring on the low-speed drum corresponding to substantially the entire range of movement of the object for controlling the operation of the first-mentioned relay means, a slow-down ring on the low-speed drum for controlling the operation of the second-named relay means, a transfer relay, a transfer ring on the low-speed drum for controlling the operation of the transfer relay, a control ring on the high-speed drum corresponding to any small range of movement of the object for also controlling the operation of the first-mentioned relay means, contact means individual to the rings on each of the drums and rotatable relative thereto, and means for presetting the contact means to any position along the rings thereby to effect the energization of the relay means to energize the motors in parallel circuit relation to initiate the movement of the object to the position corresponding to the position of the contact means, to effect the de-energization of the second-named relay means after a predetermined number of revolutions of the motors to connect the motors in series circuit relation, to effect the energization of the transfer relay to transfer the control of the first-named relay means to the control ring on the high-speed drum, and to effect the de-energization of the first-mentioned relay means to disconnect the motors from the source of energy at the time when the object is in a position corresponding to the position of the contact means.

FRANK P. TAUGHER.